(12) United States Patent
Aguilera

(10) Patent No.: US 11,001,351 B1
(45) Date of Patent: May 11, 2021

(54) EXTRACTION VESSEL FOR EXTRACTING FLOATING DEBRIS

(71) Applicant: Pablo Manuel Aguilera, North Miami Beach, FL (US)

(72) Inventor: Pablo Manuel Aguilera, North Miami Beach, FL (US)

( * ) Notice: Subject to any disclaimer, the term of this patent is extended or adjusted under 35 U.S.C. 154(b) by 0 days.

(21) Appl. No.: 16/683,253

(22) Filed: Nov. 13, 2019

(51) Int. Cl.
| B63B 35/32 | (2006.01) |
| B63B 35/38 | (2006.01) |
| E02B 15/10 | (2006.01) |
| B60F 3/00  | (2006.01) |
| B60P 3/10  | (2006.01) |
| B63B 43/14 | (2006.01) |

(52) U.S. Cl.
CPC ............ B63B 35/32 (2013.01); B63B 35/38 (2013.01); E02B 15/104 (2013.01); *B60F 3/0061* (2013.01); *B60P 3/1033* (2013.01); *B63B 43/14* (2013.01)

(58) Field of Classification Search
CPC .......... B63B 35/32; B63B 35/34; B63B 43/14
See application file for complete search history.

(56) References Cited

U.S. PATENT DOCUMENTS

| 3,845,631 | A |   | 11/1974 | Malan |   |
| 5,456,197 | A | * | 10/1995 | Kwok | B63B 35/32 |
|           |   |   |         |      | 114/382 |
| 5,544,607 | A | * | 8/1996  | Rorabaugh | B60F 3/0046 |
|           |   |   |         |      | 114/123 |
| 6,929,113 | B1 |   | 8/2005  | Hoover et al. |   |
| 7,045,058 | B2 | * | 5/2006  | Walczyk | B63B 35/32 |
|           |   |   |         |      | 210/170.05 |
| 10,323,376 | B1 | * | 6/2019  | Nickelson | B63B 1/121 |
| 2004/0134402 | A1 |   | 7/2004  | Schmidt et al. |   |
| 2005/0155540 | A1 |   | 7/2005  | Moore |   |

(Continued)

FOREIGN PATENT DOCUMENTS

| JP | 02095999 A | * | 9/1998 | ............ B63B 35/32 |
| WO | WO 2017069345 A1 | * | 4/2017 | ............ B63B 35/32 |

OTHER PUBLICATIONS

International Search Report, dated Mar. 3, 2021, for International (PCT) Application No. PCT/US20/56900, filed Oct. 22, 2020.

(Continued)

*Primary Examiner* — Andrew Polay
(74) *Attorney, Agent, or Firm* — Stephen Bongini; Fleit Intellectual Property Law

(57) ABSTRACT

An extraction vessel is provided that includes two pontoons forming parallel hulls, a cargo hold located between the pontoons, and a retractable extraction conveyor belt located between the pontoons and mounted on tracks so as to be movable between retracted and deployed positions. In the retracted position, a lower end of the conveyor belt is above the waterline of the vessel. In the deployed position, the lower end of the conveyor belt is below the waterline for extracting the floating debris, and an upper end of the conveyer belt is above the cargo hold to discharge the floating debris into the cargo hold. Also provided is an extraction vessel that includes variable buoyancy floats attached to the pontoons and movable between a raised position in which the lowest surface of the float is above the waterline, and a lowered position in which part of the float is submerged.

20 Claims, 11 Drawing Sheets

(56) References Cited

U.S. PATENT DOCUMENTS

2006/0065586 A1    3/2006  Walczyk
2016/0159437 A1    6/2016  Pappas et al.
2020/0130787 A1*  4/2020  Hernandez ............. A01D 44/00

OTHER PUBLICATIONS

Written Opinion of the International Searching Authority, dated Mar. 3, 2021, for International (PCT) Application No. PCT/US20/56900, filed Oct. 22, 2020.

* cited by examiner

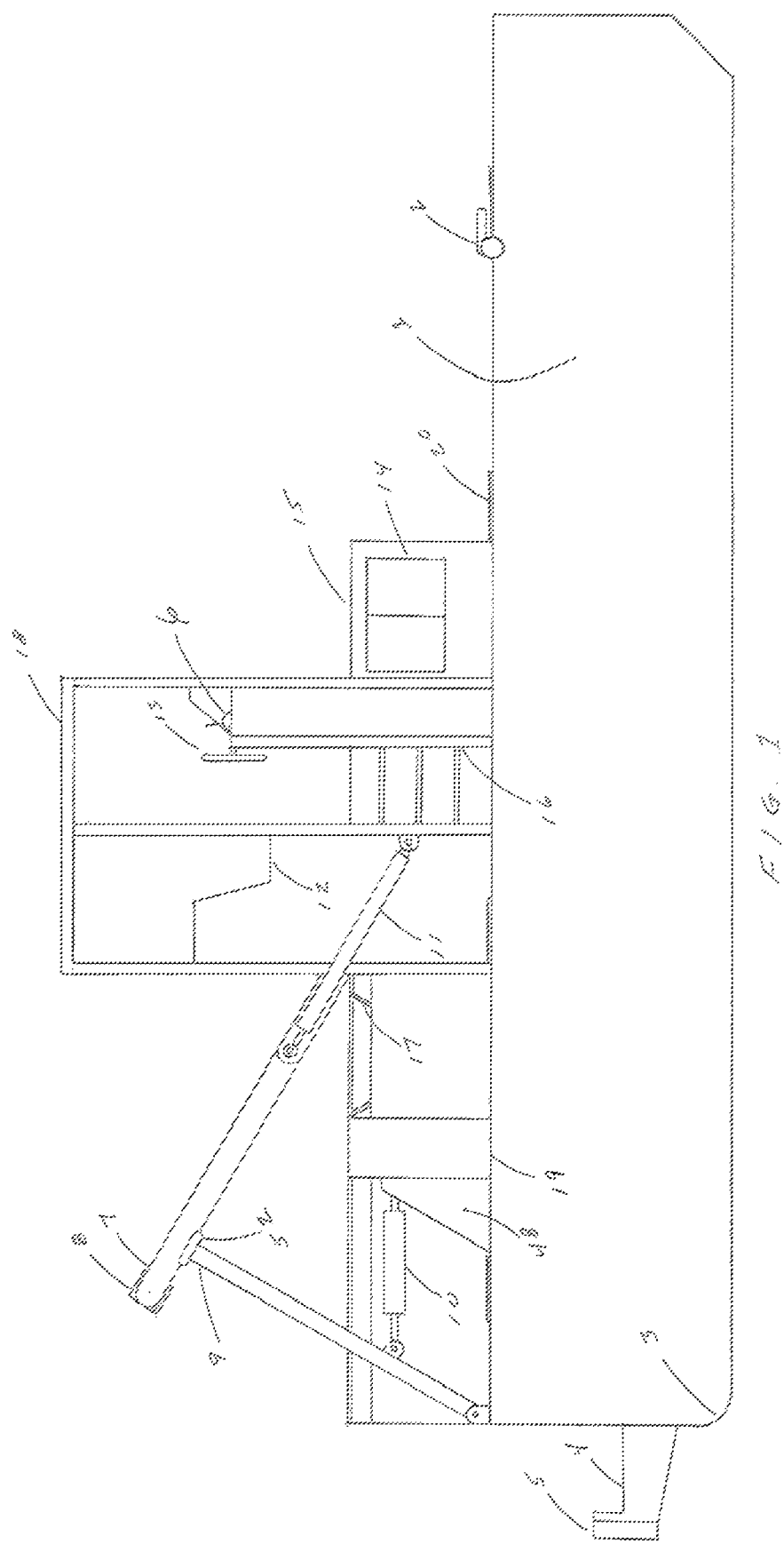

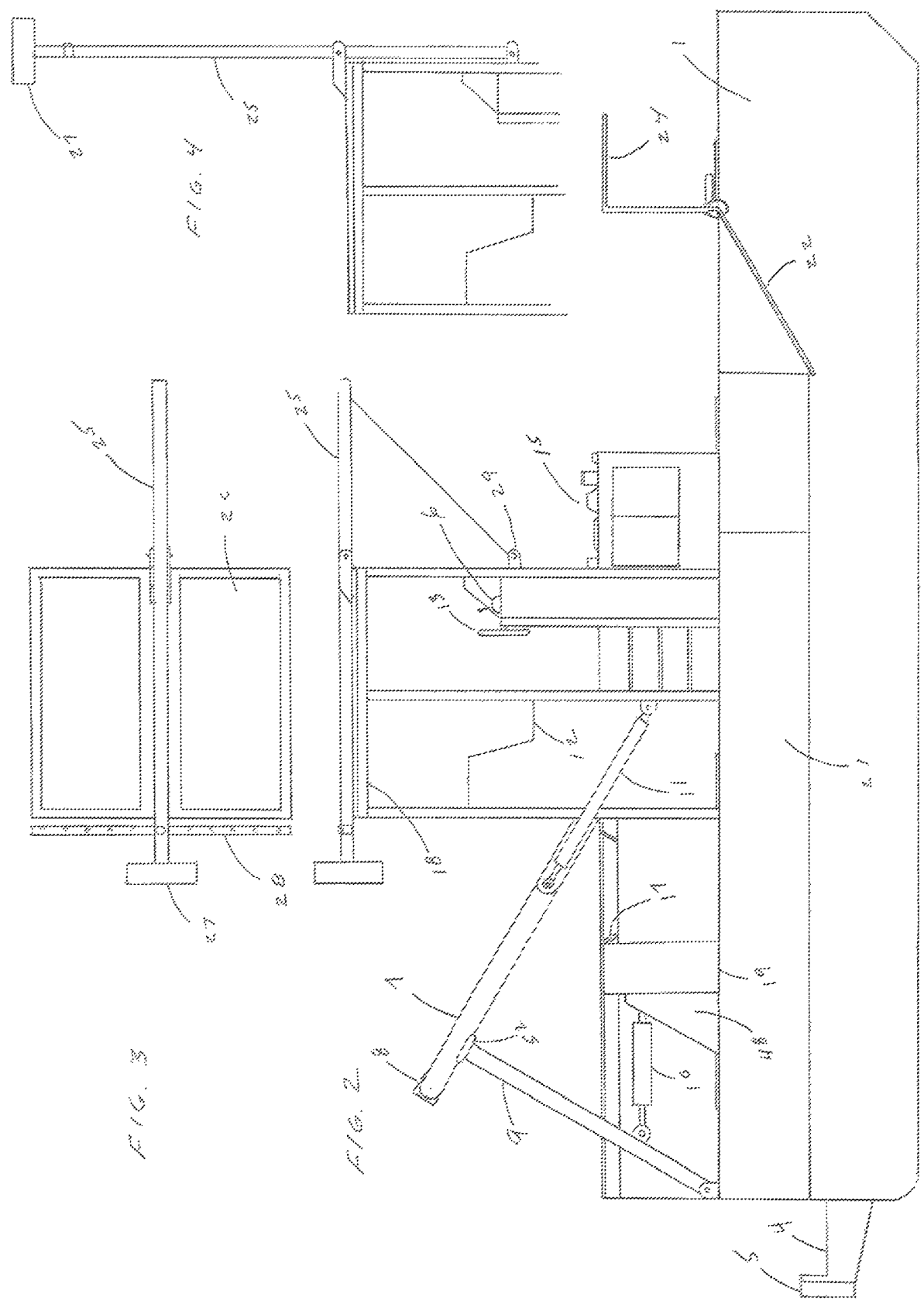

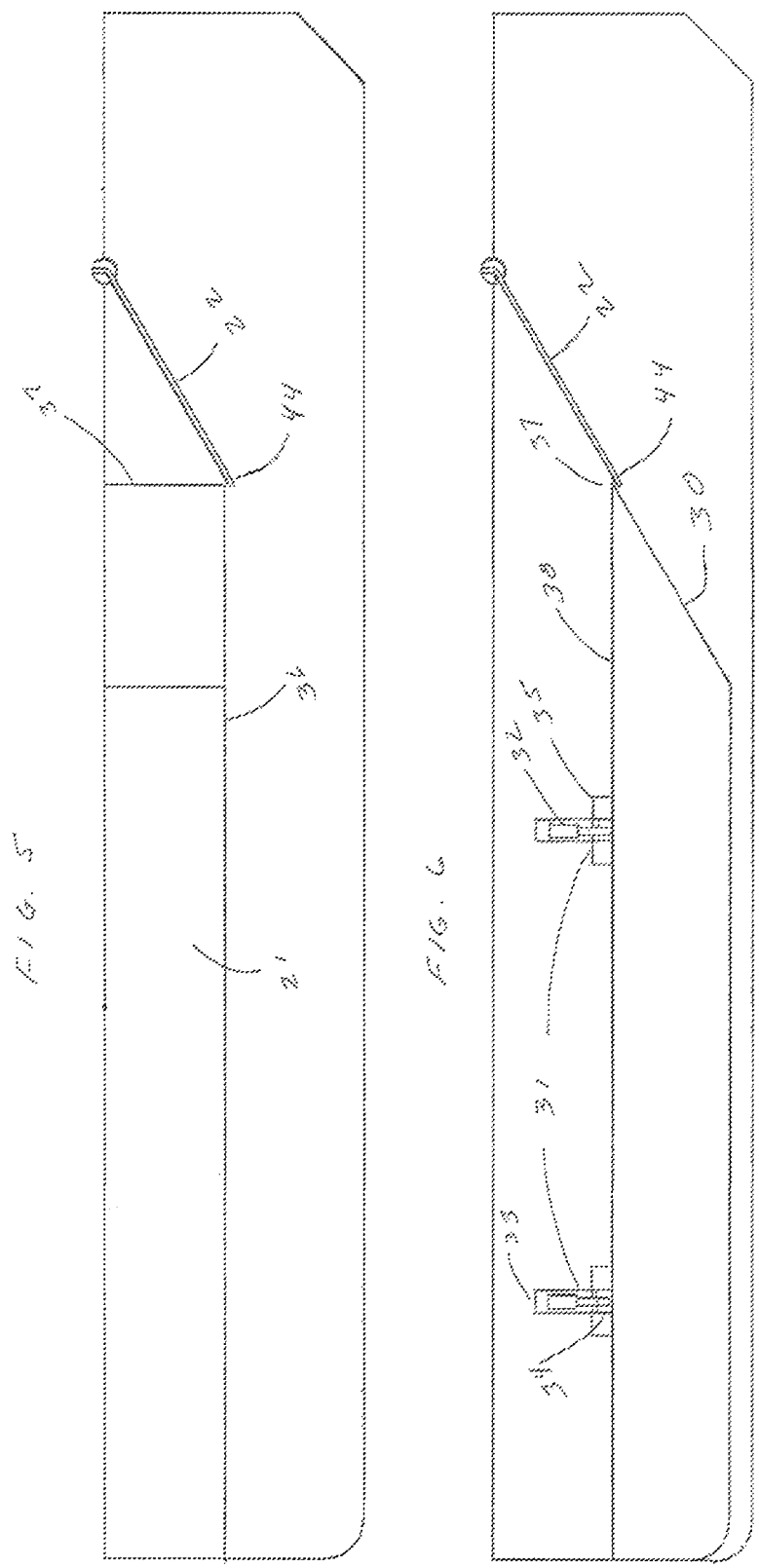

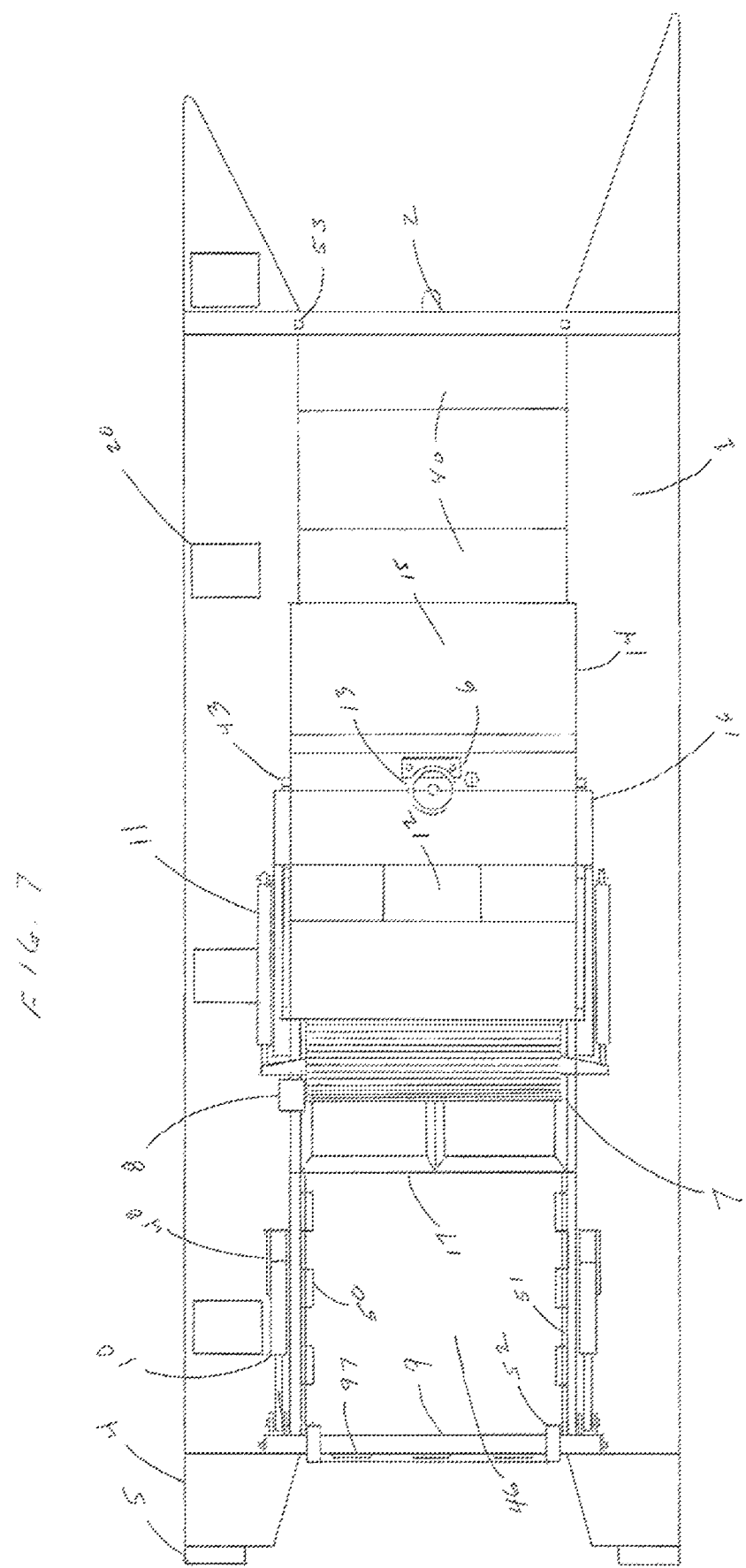

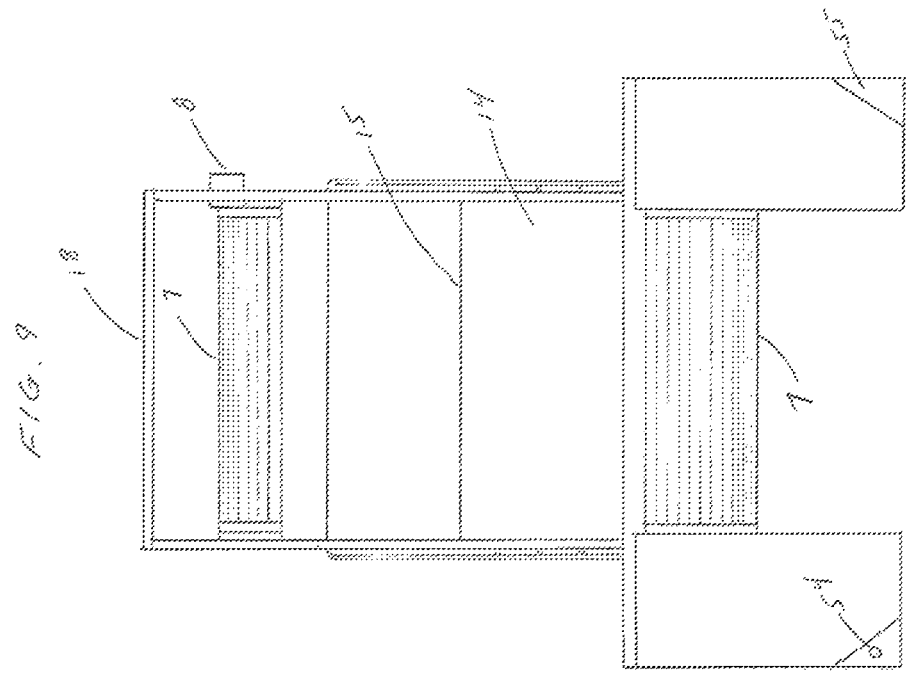
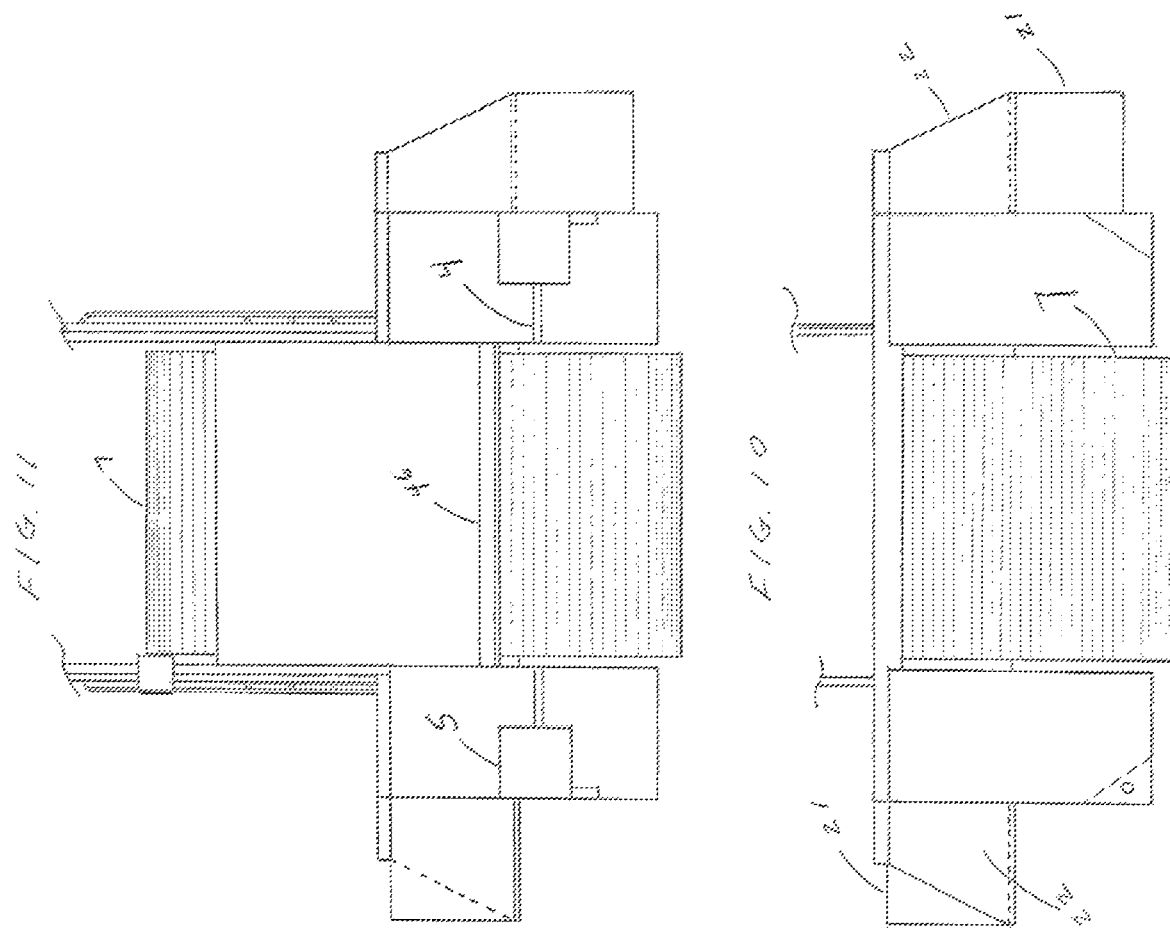

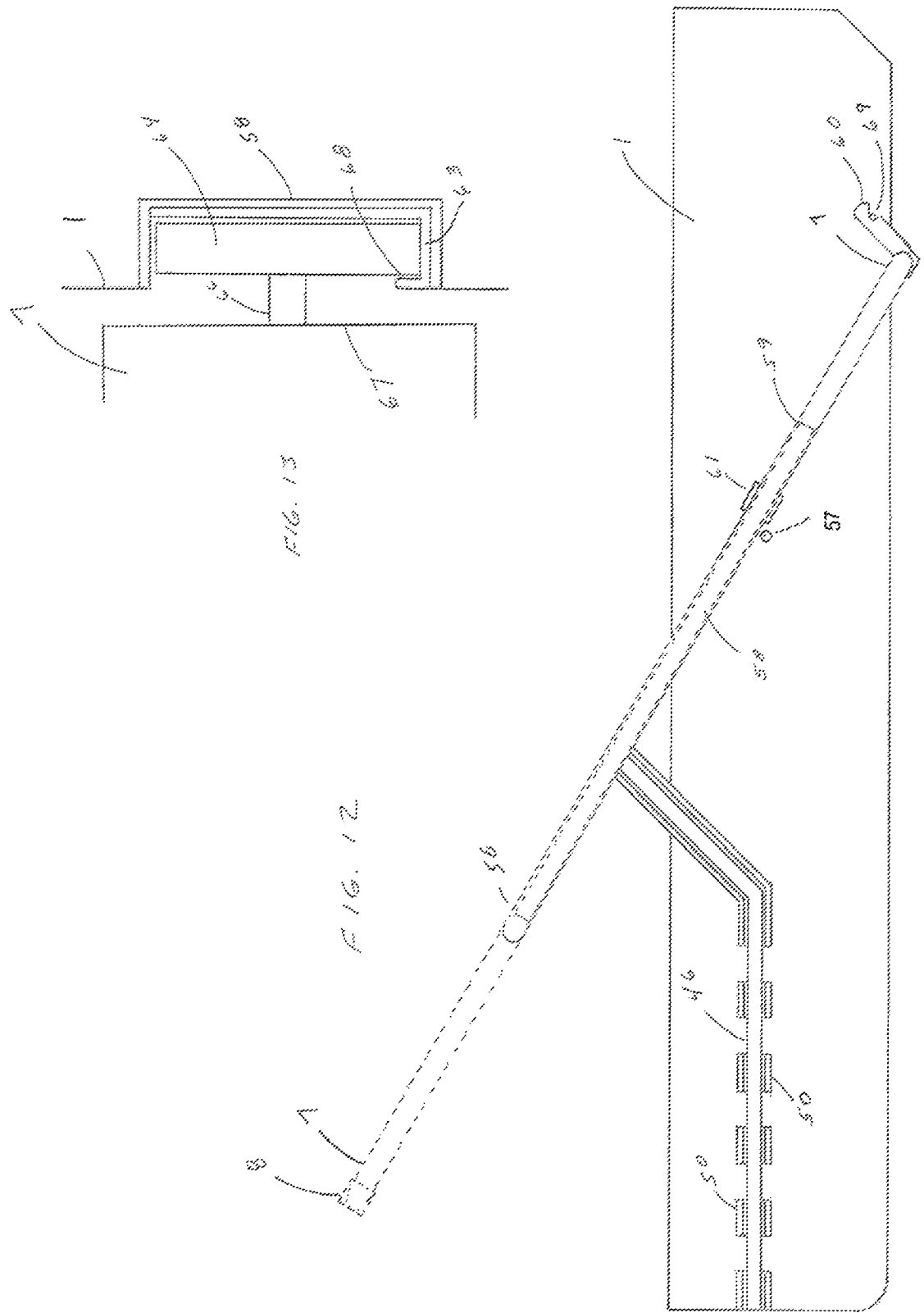

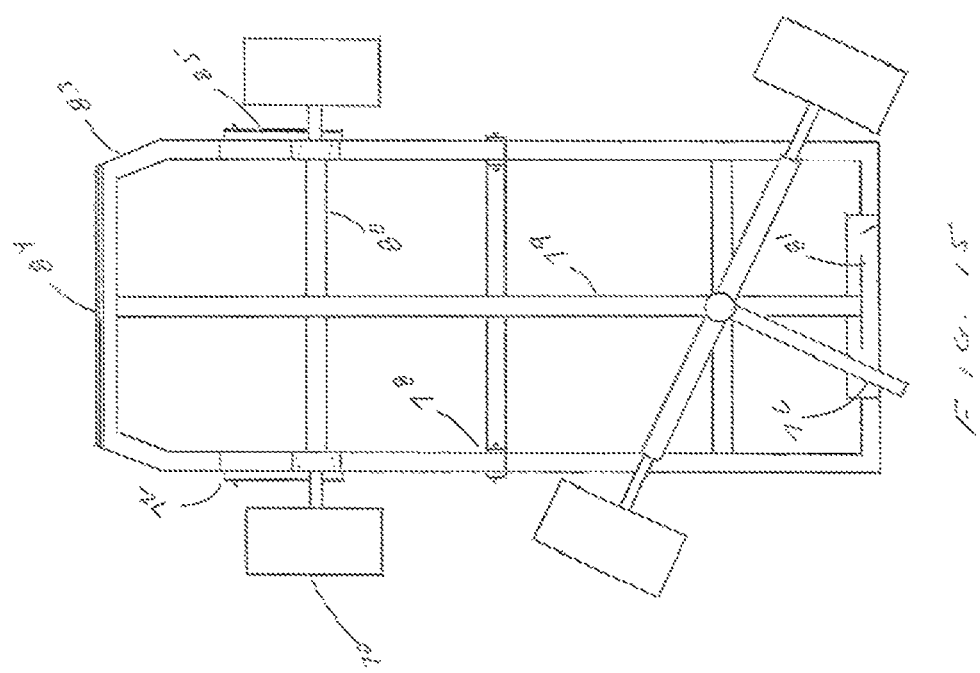
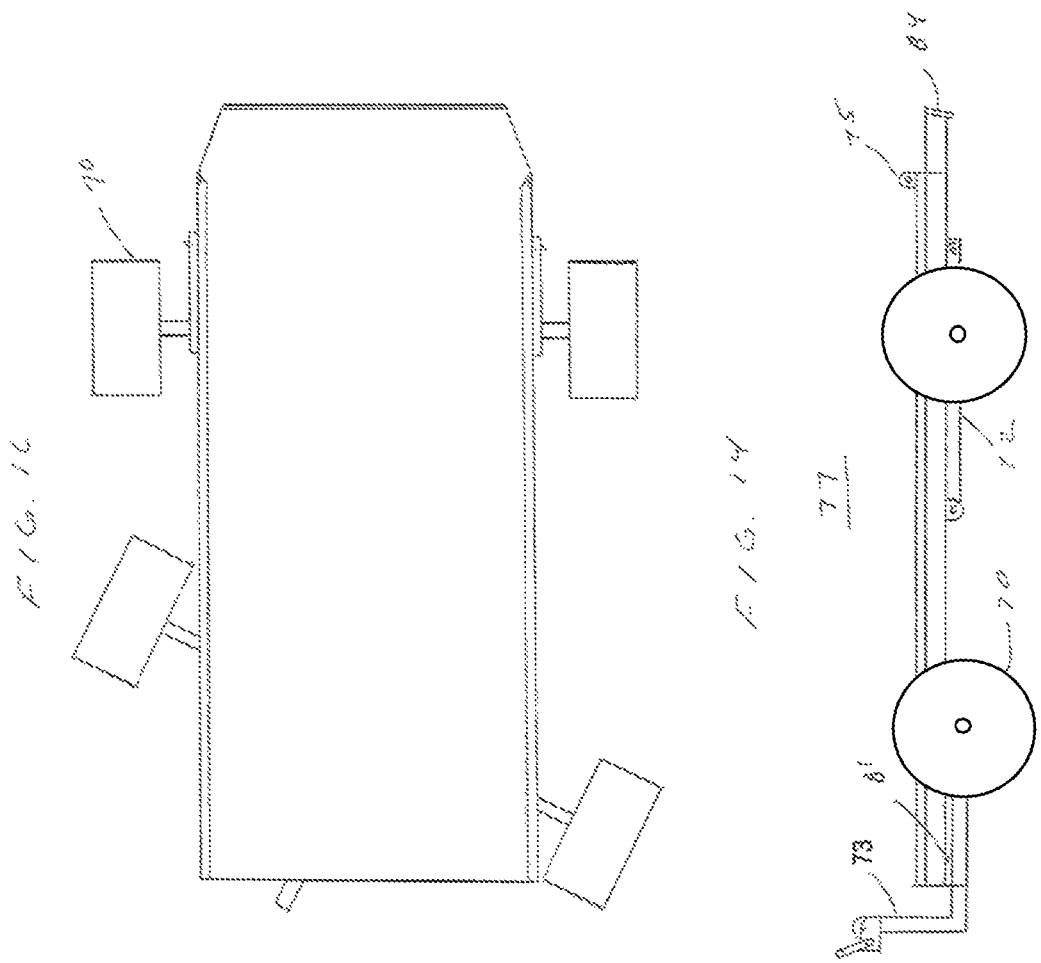

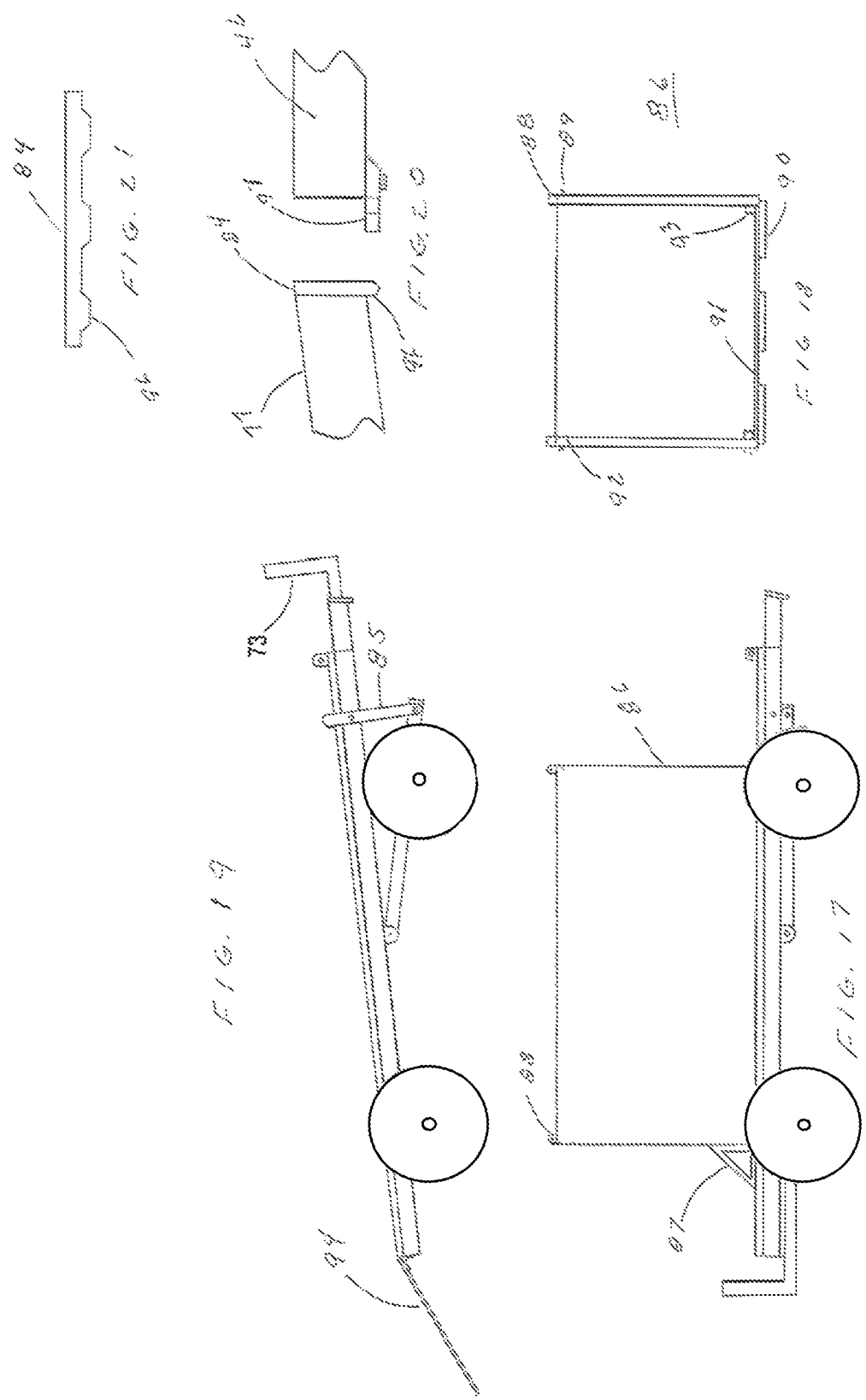

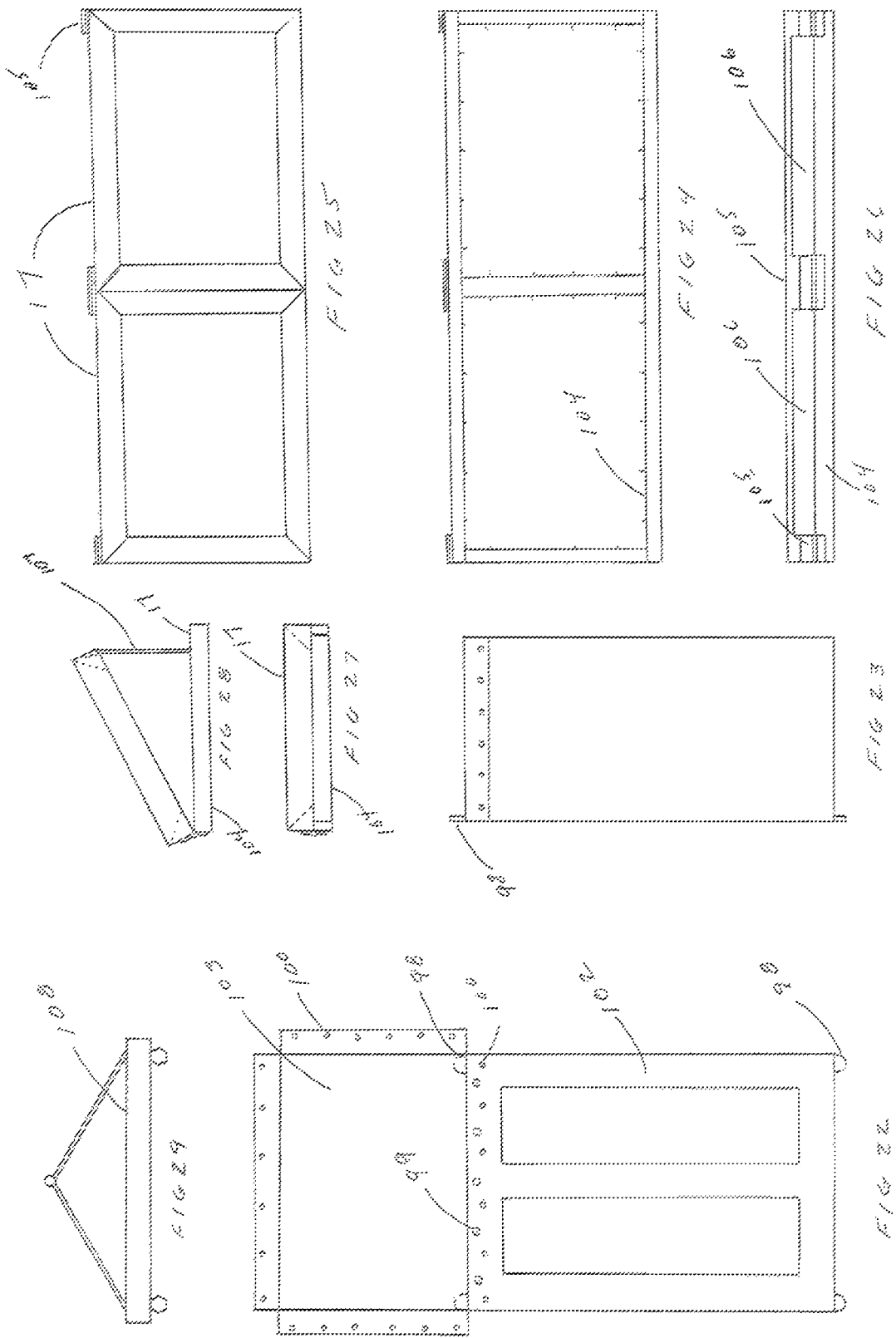

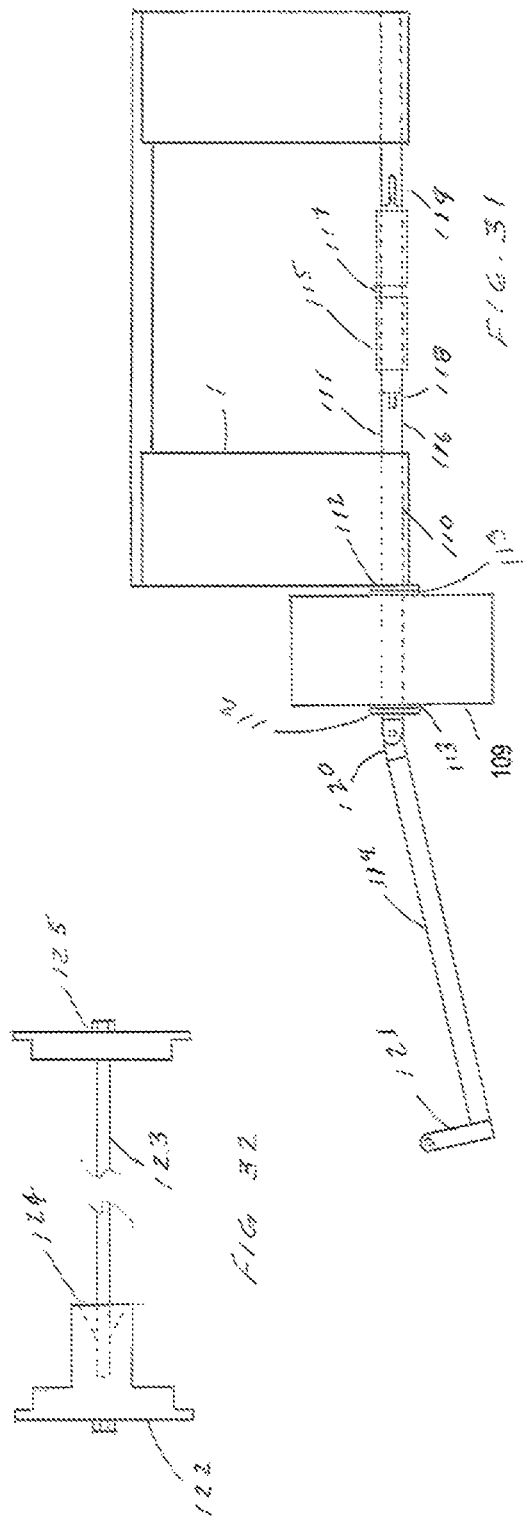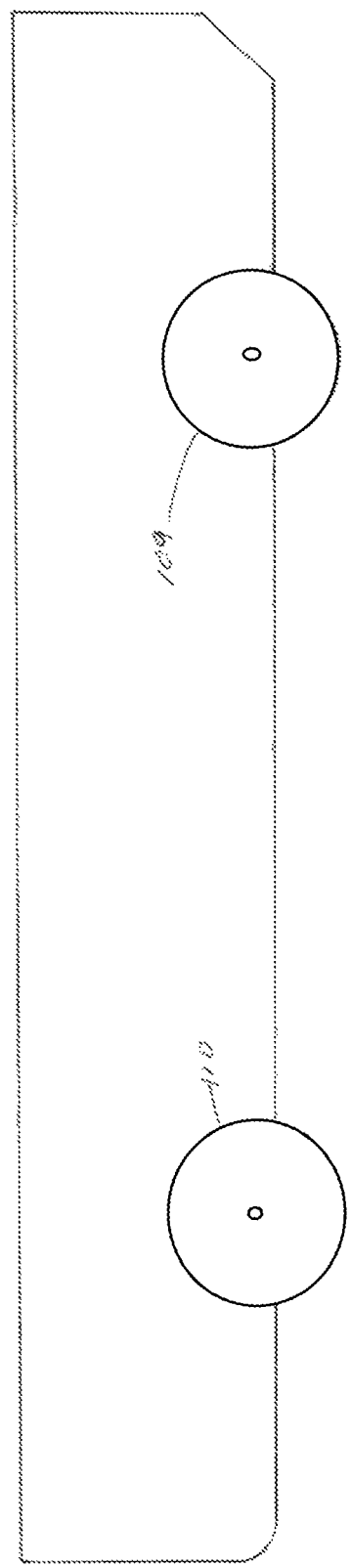

EXTRACTION VESSEL FOR EXTRACTING FLOATING DEBRIS

FIELD OF THE DISCLOSURE

The disclosure generally relates to watercraft, and more specifically to an extraction vessel for extracting floating debris such as Sargassum or plastic.

BACKGROUND

Sargassum is a brown marine algae (seaweed). There are many species of Sargassum but only two holopelagic species that free float on the surface of the ocean (i.e., they never attach to the ocean floor). These free-floating holopelagic species have branches, leafy appendages, and berry-like bladders that are filled with gas to add buoyancy. This Sargassum grows into large dense floating mats that can cover as much area as a football field. Sections of these mats are carried away by winds, currents, and waves, and wash ashore on coastlines along the Atlantic Ocean and Caribbean Sea. In the past, small seasonal quantities of Sargassum would wash ashore. But recently larger and larger quantities have been washing ashore, and in some areas the amount has reached epidemic proportions. These recent influxes are threatening fragile and endangered coastal ecosystems, and greatly affecting tourism in coastal destinations.

Additionally, it has been well documented that the amount of floating plastic is reaching epidemic proportions in many of the world's coastal areas. The reasons and sources are many, and increased production and use is only making the situation get worse over time.

While there are known vessels for extracting Sargassum, floating plastic, and even freshwater weeds, these conventional vessels have extraction conveyor belts that are tilted out of the water, are designed for calm water conditions, are slow moving, and have limited beach deployment capabilities. One conventional Sargassum extraction vessel currently in use has a bow-mounted tilting extraction conveyor belt for extracting Sargassum, and a stern-mounted discharge conveyor belt for unloading the collected Sargassum. This vessel also has a draft that prevents shallow water operation. So if nearby dockage is not available after a load is extracted, the collected Sargassum must spewed from the stern back onto the water and manually raked up. Needless to say, this is very inefficient, messy, environmentally insensitive, and disruptive to tourists trying to enjoy the beach.

Another conventional Sargassum extraction vessel currently in use also uses a bow-mounted tilting extraction conveyor belt. Additionally, this vessel has a low freeboard and the operator is positioned right on the bow of the boat. This limits any practical operation to only calm water conditions. In even moderate conditions, the operator would have to be strapped in for an uncomfortable and very wet ride. Additionally, the extracted Sargassum is placed in net-type bags that are dropped overboard when full for towing to shore by a support vessel. This open net design causes significant drag so the bags can only be towed very slowly.

Yet another conventional Sargassum extraction vessel has a stern-mounted tilting extraction conveyor belt that transfers the Sargassum into another vessel that is tied to the stern. This limits the extraction operation to occurring at a very low speed of only two knots, and only in calm water conditions with waves of less than two feet. If this conventional extraction vessel attempted to operate in any rougher conditions, the waves would cause the vessels to crash into one another. Further, the extraction conveyor belt located on the stern of the vessel must extend several feet past the transom so that the extracted Sargassum can be deposited into the other vessel that is following. Because all of this weight is over and past the stern, a rectangular float must be positioned sideways under the stern in order to keep the motors from being submerged. The tremendous drag associated with this sideways float limits this conventional extraction vessel to a maximum transit speed of only 4 knots (when not performing extraction). And the extraction conveyor belt located on the stern must be tilted on its pivot to raise it out of the water.

Other conventional extraction vessels also have very low freeboard (low buoyancy) and poor weight distribution that prevents rough water operation and fast transit speeds (over 10 knots). They also have a bow mounted tilting mechanism (if any) for raising the extraction conveyor belt. When the extraction conveyor belt is tilted up (out of the water) with such a tilting mechanism, additional weight is placed on the bow of the vessel. And the raised belt can still be submerged when encountering waves, so as to cause drag and possible damage.

In view of the foregoing, an improved extraction vessel is needed. In particular, what is needed is an extraction vessel for extracting floating debris (such as Sargassum or plastic) that overcomes these drawbacks.

SUMMARY OF THE DISCLOSURE

One embodiment of the present disclosure provides an extraction vessel for extracting floating debris. This extraction vessel includes two pontoons forming parallel hulls of the vessel, a cargo hold located between the pontoons, and a retractable extraction conveyor belt located between the pontoons. The conveyor belt is mounted on tracks so as to be movable on the tracks between a retracted position and a deployed position. In the retracted position, a lower end of the conveyor belt is above a waterline of the vessel for transit. In the deployed position, the lower end of the conveyor belt is below the waterline for extracting the floating debris, and an upper end of the conveyer belt is above the cargo hold such that the floating debris is discharged from the upper end of the conveyor belt into the cargo hold.

Another embodiment of the present disclosure provides another extraction vessel for extracting floating debris. This extraction vessel includes two pontoons forming parallel hulls of the vessel, a cargo hold located between the pontoons, an extraction conveyor belt located between the pontoons, and two variable buoyancy floats. The conveyor belt is movable between a raised position in which a lower end of the conveyor belt is above a waterline of the vessel, and a lowered position in which the lower end of the conveyor belt is below the waterline and an upper end of the conveyer belt is above the cargo hold. One of the variable buoyancy floats is attached to each of the pontoons so as to be movable between a retracted position and a deployed position. In the retracted position, a lowest surface of the variable buoyancy float is above the waterline. In the deployed position, a portion of the variable buoyancy float is submerged for increased buoyancy.

Other objects, features, and advantages of the present disclosure will become apparent from the following detailed description. It should be understood, however, that the detailed description and specific examples, while indicating preferred embodiments of the present disclosure, are given by way of illustration only and various modifications may naturally be performed without deviating from the present disclosure.

BRIEF DESCRIPTION OF THE DRAWINGS

FIG. 1 is a side view of a floating debris extraction vessel in accordance with an embodiment of the present disclosure;

FIG. 2 is a side view of a floating debris extraction vessel in accordance with another embodiment of the present disclosure;

FIG. 3 is a partial top view of the floating debris extraction vessel of FIG. 2 with its mast down;

FIG. 4 is a partial side view of the floating debris extraction vessel of FIG. 2 with its mast up;

FIG. 5 is a partial side view of the floating debris extraction vessel of FIG. 2 with its variable buoyancy floats retracted;

FIG. 6 is a partial side view of the floating debris extraction vessel of FIG. 2 with its variable buoyancy floats deployed;

FIG. 7 is a top view of the floating debris extraction vessel of FIG. 1;

FIG. 9 is a partial front view of the floating debris extraction vessel of FIG. 2 with the conveyor belt retracted;

FIG. 10 is a partial front view of the floating debris extraction vessel of FIG. 2 with the conveyor belt deployed;

FIG. 11 is a partial rear view of the floating debris extraction vessel of FIG. 2 with the conveyor belt deployed;

FIG. 12 is a partial cross-sectional view of a floating debris extraction vessel in accordance with an embodiment of the present disclosure;

FIG. 13 shows detail of a portion of the support track of FIG. 12;

FIG. 14 is a side view of a trailer for a floating debris extraction vessel in accordance with an embodiment of the present disclosure;

FIG. 15 is a bottom view of the trailer of FIG. 14;

FIG. 16 is a top view of the trailer of FIG. 14;

FIG. 17 is a side view of the trailer of FIG. 14 with a cargo hold container;

FIG. 18 is a view of the cargo hold container of FIG. 17;

FIG. 19 is a side view of the trailer of FIG. 14 in its cargo bag loading configuration;

FIG. 20 shows detail of the cargo hold container hookup of FIG. 17;

FIG. 21 is a rear view of the support bar of FIG. 20;

FIG. 22 shows a cargo bag in accordance with an embodiment of the present disclosure in an open state;

FIG. 23 is a side view of the cargo bag of FIG. 22 in a closed state and ready for towing;

FIG. 24 is a top view of a cargo bag support bracket in accordance with an embodiment of the present disclosure;

FIG. 25 is a top view of a loading funnel in accordance with an embodiment of the present disclosure;

FIGS. 26-28 show the cargo bag support bracket and loading funnel;

FIG. 29 shows a floating towing rod in accordance with an embodiment of the present disclosure;

FIG. 30 is a partial side view of a floating debris extraction vessel with wheels attached in accordance with an embodiment of the present disclosure;

FIG. 31 shows detail of the wheel installation for the floating debris extraction vessel of FIG. 30; and FIG. 32 shows detail of the covering caps for the floating debris extraction vessel of FIG. 30.

DETAILED DESCRIPTION

Figure 8:
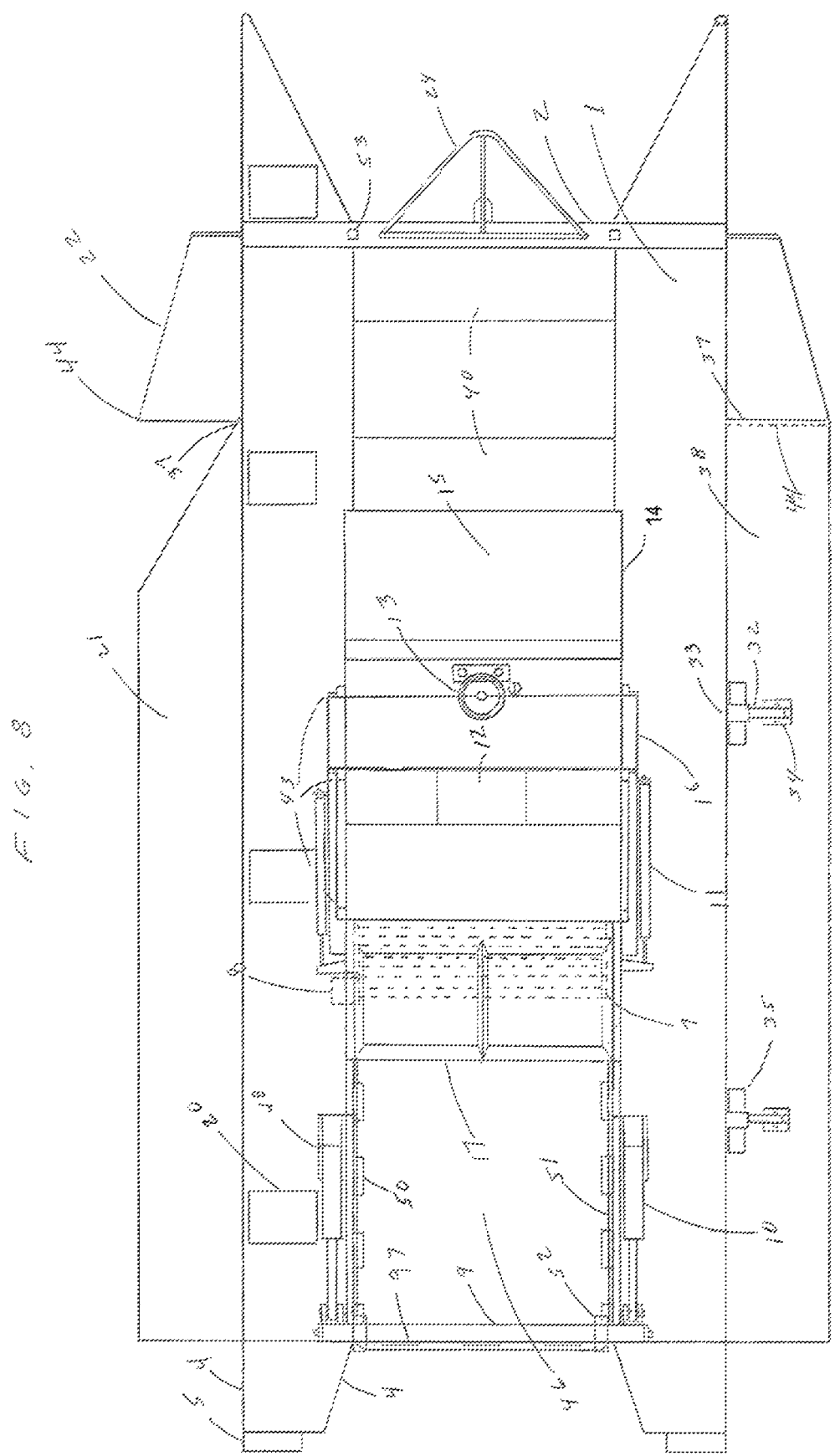
FIG. 8 is a top view of the floating debris extraction vessel of FIG. 2.

As required, embodiments of the present disclosure are disclosed herein; however, it is to be understood that the disclosed embodiments are merely examples and that the systems and methods described below can be embodied in various forms. Therefore, specific structural and functional details disclosed herein are not to be interpreted as limiting, but merely as a representative basis for teaching one skilled in the art to variously employ the present subject matter in virtually any appropriately detailed structure and function. Further, the terms and phrases used herein are not intended to be limiting, but rather, to provide an understandable description of the concepts.

Embodiments of the present disclosure provide an improved floating debris extraction vessel with fast transit speeds that is capable of operation in rough water conditions. The floating debris extraction vessel of one embodiment has a retractable extraction conveyor belt that simply retracts when not in use during transit to move its weight aft and totally eliminate any water induced drag. In some embodiments, the floating debris extraction vessel has variable buoyancy floats that reduce draft to make the vessel capable of shallow water deployment (e.g., from a beach). The variable buoyancy floats also allow loading and unloading while the vessel is resting on the bottom. The deployment of the variable buoyancy floats increases the submerged beam by 42%, which provides additional lateral stability to reduce rolling motion when the vessel is traveling parallel to the waves (e.g., during extraction). This increases the efficiency of the extraction operation and improves crew comfort. Some embodiments also have other advantageous features such as streamlined wave piercing (no lateral flare) inner hulls, high freeboard, carefully adjusted weight distribution with reduced weight near the bows to maximize lift, and a wave deflector/lift generator. The improved floating debris extraction vessel is capable of achieving fast transit speeds to the extraction zone and is capable of rough water operation. The ability to handle rough open water conditions allows operation most or all of the year, so as to increase the amount of debris that can be extracted.

Further, some embodiments permit both docking and beach deployment (e.g., from a mooring). Many coastal areas have a very limited amount of available dockage in piers, harbors, or marinas, and this beach deployment ability allows the vessel to be exactly positioned in the extraction zone. This reduces long transit times to reach the extraction zone, thus increasing the time available for actually extracting debris. And some embodiments have detachable wheels for towing the vessel out of the water and onto the shore (e.g., a beach). This provides a great advantage when severe weather or a major storm is approaching. Additionally, some embodiments include a trailer that permits unloading of cargo (i.e., extracted debris in a container) right onto the beach. Thus, there is provided an extraction and disposal operation that is very environmentally clean, efficient, and effective.

While the extraction vessels described herein are particularly suited for extracting Sargassum and/or floating plastic, the vessels are capable of extracting any debris that is floating on or near the surface of the water. The following description refers to the exemplary use of extracting Sargassum for ease of explanation, but is equally applicable to the extraction of any other floating debris.

FIGS. 1 and 7 show a floating debris extraction vessel in accordance with an embodiment of the present disclosure. The vessel is a catamaran with two parallel pontoon-type hulls 1. The pontoons 1 are connected in the forward area by a forward support beam 2 that includes an anchor holder and a bridle connector 53 for mooring/anchor lines. The stern portion of each pontoon 1 is rounded at the bottom 3 to direct upwards the attached laminar water flow along the bottom surface as it exists when the vessel is in motion. This provides additional water flow and therefore thrust to the vertically raised outboards during shallow water operation. (In other embodiments, the lower stern portions 3 of the pontoons 1 have standard angular terminations.)

In the rear area, a cargo hold 46 is attached between the pontoons 1 using cargo hold support brackets 50. In this embodiment, upper and lower cargo hold L-shaped support brackets 50 are used to attach the bottom of the cargo hold 46 to the pontoons 1. The front, back, and side faces of the cargo hold 46 are integral with or attached to this bottom. As shown in FIG. 12, in this embodiment the forward portion of the cargo hold is tilted forward at a 45 degree angle to deflect incoming waves downward, which generates lift and reduces drag. Water drainage slots 51 allow for the escape of water that is carried in with the extracted debris, and an access door 19 is provided for accessing the cargo hold. In addition to the standard tilt and trim incorporated into the outboard motors, a power lift transom jack 5 is installed on an outboard engine transom mounting bracket 4 on the rear of each pontoon 1. This provides five vertical inches of travel to allow the outboard motors to be directly raised by this amount. This reduces draft while maintaining the propeller thrust directly backward, so as to make the propulsion system more efficient for shallow water operation.

A retractable extraction conveyor belt 7 is also located between the pontoons 1. The extraction conveyor belt 7 is shown in the deployed (down) position in FIG. 7 and by dotted lines in FIG. 1, and is shown in the retracted (up) position by solid lines in FIG. 1. A hydraulic motor 8 is attached to the upper pulley of the conveyor belt 7. A upside down U-shaped lift bar 9 supports the retracted conveyor belt 7 near its upper end via support brackets 52. First telescopic hydraulic cylinders 10 are each connected between an upper end of the lift bar 9 and a bracket 48 that is attached to one of the pontoons 1. Second telescopic hydraulic cylinders 11 are connected to a central portion of the conveyor belt 7. These hydraulic cylinders are used to raise and lower the conveyor belt. Funnel panels 17 are located in the front of the cargo hold area for filling cargo bags during the extraction operation. The design and operation of the conveyor belt is explained in detail below.

The vessel of this embodiment is an all-aluminum vessel to keep it light and make it impact resistant. Additionally, the vessel of this embodiment includes many crew conveniences such as a helm seat 12, steering wheel 13, controls 6, helm steps 16 with a handrail, a hardtop 18, and deck hatches 20 (e.g., four per pontoon). The helm seat 12 of this embodiment is divided into multiple seats, some of which can be removable to provide access to a porta potty and cooler. Catwalks 40, which can be slotted for weight reduction, are provided next to the forward support beam 2 and the forward storage area 14. Top support brackets 43 (e.g., three per side) are connected to the deck and superstructure for support. Also provided is a forward storage area 14 (e.g., for a hydraulic system locker, a generator locker, and an anchor locker) and a mounting surface 15 (e.g., for a winch, blocks, clutches, cleats, windlass, rope guides, and the like). This embodiment also includes a drone platform 24 for using a drone to efficiently find areas of floating debris.

And to increase operational efficiency, in this embodiment an internal fuel tank is installed in each pontoon 1 for extra fuel capacity. A waterproof fuel cap feed line for these tanks is located on both the inside of the cargo hold and outside of the pontoons on the forward portion of the cargo hold. A plastic fuel bladder can be loaded above the cargo hold using the lift bar, with hoses connected to either side of the bladder and to the feed lines so as to gravity feed the tanks. The tanks can also be manually filled using plastic containers or external fuel pumps.

FIGS. 2 and 8 show a floating debris extraction vessel in accordance with another embodiment of the present disclosure. This vessel differs from the previous embodiment by the attachment of a variable buoyancy float 21 to the outside of each pontoon 1. These floats 21 can be retracted (raised) for fast transit speeds or deployed (lowered) to add buoyancy and increase stability. A wave deflector/lift inducing panel 22 attached to the end of the forward support beam 2 extends to the front of each float 21. Each of the variable buoyancy floats 21 is attached to one of the pontoons 1 by a pair of recessed hinges 35. The floats are operated by a pair of triple-rod telescopic hydraulic cylinders 32, each of which is attached between a first mounting bracket 33 on the pontoon 1 and a second mounting bracket 34 on the float 21. In this embodiment, triple piston telescopic cylinders are used so notches (cut outs) 31 for the cylinders are provided in the side of the pontoon 1. In other embodiments, notches are provided on the tops of the pontoons for standard single piston double-acting hydraulic cylinders.

The float 21 on starboard (lower) side of FIG. 8 is in the deployed position. As shown in FIGS. 6 and 8, in the deployed position the upper side 38 of the variable buoyancy float 21 (in this position) lines up vertically with the lower end 44 of the wave deflector/lift generating panel 22, with a slight underlap by the panel. The front edge 37 of this upper side 38 of the variable buoyancy float 21 lines up horizontally (front-to-back) with the lower end 44 of the wave deflector/lift generating panel 22, with a slight overlap. The front face 30 of the float 21 (in this position) extends downward from the lower (and rear) end 44 of the panel 22 at the same angle as the panel 22.

The float 21 on port (upper) side of FIG. 8 is in the retracted position. As shown in FIGS. 2, 5, and 8, in the retracted position the lower side 36 of the variable buoyancy float 21 (in this position) lines up vertically with the lower end 44 of the wave deflector/lift generating panel 22, with a slight underlap by the panel. The front edge 37 of the variable buoyancy float 21 lines up horizontally (front-to-back) with the lower (and rear) end 44 of the wave deflector/lift generating panel 22, with a slight overlap.

The vessel of this embodiment also includes a tilting mast 25 that is connected by a line to a bracket, clutch, or winch 29. The tilting mast is in the down position in FIGS. 2 and 3, and is in the up and locked position in FIG. 4. A radar 27 is located at the top of the mast 25, and below that a halogen light support bar 28 is installed. Additionally, the hardtop 18 over the helm station is equipped with solar panels 26 for charging the battery bank. The hardtop 18 has snaps along the edges to allow complete enclosure with canvas panels with windows for foul weather operation.

The retractable extraction conveyor belt system of one exemplary embodiment will now be described with reference to FIGS. 2 and 9-13. FIGS. 2 and 9 respectively are a side view and a front view with the conveyor belt retracted.

FIGS. 10 and 11 respectfully are a front view and a rear view with the conveyor belt deployed. FIG. 12 is a cross section through the conveyor belt, with the position of the conveyor belt when deployed shown in solid lines and when retracted shown in dotted lines. Note that FIGS. 10 and 11 show the vessel with the starboard side variable buoyancy float 21 retracted and the port side variable buoyancy float 21 deployed, while these same floats are omitted from the partial view of FIG. 9.

For this exemplary embodiment with a 36 foot hull length, the retractable extraction conveyor belt 7 is 22 feet long, seven feet wide, and has a pulley diameter of eight inches (all dimensions are appropriately scaled for a smaller or larger vessel). The conveyor belt 7 is rotated by a variable speed hydraulic motor 8 that is connected to the upper pulley on the port side (the motor and deployed conveyor belt are shown by dotted lines in FIG. 8). As shown in FIGS. 12 and 13, the conveyor belt 7 is mounted on two matching U-shaped tracks 58 that are each flush mounted at an incline (e.g., a 30-35 degree inclination) on the inner side of one of the pontoons 1 and to the superstructure (i.e., the helm station structure below the hardtop 18 and the support structure below the mounting surface 15). With the 22 foot conveyor belt of this exemplary embodiment, each of the U-shaped tracks 58 is six inches high, 2.5 inches wide, and about 15.5 feet long.

The width of the conveyor belt 7 is substantially equal to the distance between the pontoons 1. That is, the width of the conveyor belt is substantially equal to the distance between the pontoons except for a small allowance for clearance on each side of the conveyor (and the width of the track if not flush mounted). In embodiments in which the track 58 is flush mounted in the pontoons 1 rather than externally mounted, the conveyor belt can be about 5 inches wider in this embodiment to increase its extraction potential. Further, water drag is reduced if the track becomes submerged, and additional structural integrity is provided because the track is directly supported by the pontoons and the superstructure internal support frames. This also allows the conveyor belt to be raised above the end of the track. In other embodiments, the track is externally mounted to the inner sides of the pontoons 1, or the track is mounted on the conveyor belt and the rollers are mounted on the inner sides of the pontoons and to the superstructure.

The bottom surface (and optionally also the inside surface) of the track 58 is lined with a stainless-steel liner 63 that has a lateral guide 68 (e.g., a half inch lip) on the outside bottom side. This provides a running and containing surface for the rollers (wheels) 64. In this exemplary embodiment, each roller 64 is five inches in diameter and 1.5 inches wide. The rollers 64 near the upper and lower ends of the conveyor belt are spaced 6 inches apart to address the additional loads when the belt is fully lowered and to account for the hydraulic motor loads at its upper end. The wheels in the central portion are spaced 12 to 18 inches apart, with a total of 14 to 18 rollers being used in this exemplary embodiment. A rod (or axle) 66 connects each roller 64 to the conveyor belt 7 so as to create a gap (e.g., of approximately one inch) between the outer edge 67 of the conveyor belt 7 and the pontoon 1 (alternatively, the gap is between the conveyor belt and the track when the track is externally mounted). This gap allows for deflection during operation.

The lower end 59 of the track 58 is far enough above the bottom of the pontoons (e.g., 1.5 to 2 feet in this exemplary embodiment) to be well above the waterline. This decreases wear by lowering the chances of the rollers 64 becoming submerged during the extraction process and the track 58 contacting marine growth below the waterline. This also prevents the track from inducing drag at transit speeds.

The conveyor belt 7 is moved down the track 58 to lower the conveyor into the water for performing extraction, and is moved up the track 58 to completely raise the conveyor belt out of the water when the vessel is in transit or navigating in shallow water. The raising and lowering of the conveyor belt 7 are performed by two telescopic double acting hydraulic cylinders 11 that are each connected between the superstructure and a central or upper portion of a side of the conveyor belt 7.

When the conveyor belt is raised (retracted) by this retracting mechanism, the weight of the conveyor belt is shifted back toward the stern. This improves rough water performance by allowing the bows of the hulls to rise more easily when motoring into incoming waves. Additionally, the conveyor belt is completely raised out of the water (i.e., the lower end of the conveyor belt is above the waterline of the vessel) so there is no water related drag. The waterline of vessel with the floats retracted is about one foot above the bottoms of the pontoons. As shown in FIGS. 9 and 12, the retracted conveyor belt 7 is far from the bow of the vessel and well above the bottoms of the pontoons and waterline. In this exemplary embodiment, the front (lower) end of the fully raised conveyor belt is 14 feet from the bow of the 36 foot vessel and about 3.5 feet above the bottoms of the pontoons. Thus, damage to the conveyor belt from burying or otherwise striking objects in the water while at transit speeds is prevented. In further embodiments, the lower end of the fully raised conveyor belt is at least one foot above the bottoms of the pontoons, or anywhere between one foot above the bottoms of the pontoons and one foot below the tops of the pontoons. In yet another embodiment, the lower end of the fully raised conveyor belt is at least six inches above the waterline, or anywhere between six inches above the waterline to just below the tops of the pontoons.

Additionally, as shown in FIGS. 2 and 12, the fully raised conveyor belt 7 extends well past the upper end 56 of the track 58 (e.g., 10 feet in this exemplary embodiment). In order to prevent unsupported shock loading (e.g., during rough water transit), support for the exposed upper end of the conveyor belt is provided by the tilting lift bar 9 that is located on the stern 9. The lift bar 9 is topped by the support brackets 52 (e.g., low friction rounded plastic Delrin inserts with lateral guides). When the conveyor belt is raised, the lift bar 9 is moved by the cylinders 10 from its resting position over the stern so as to be under the upper end of the conveyor belt. The upper end of the conveyor belt 7 rests on the support brackets 52 on top of the lift bar 9 for support and to prevent damage.

When fully lowered (deployed) by the retracting mechanism, the lower end of the conveyor belt 7 extends below the bottoms of the pontoons 1 to allow for extraction of floating debris, as shown in FIGS. 10-12. In this exemplary embodiment with the track terminating two feet from the bottom of the pontoon, the lower end of the fully lowered conveyor belt 7 extends about 5.5 feet past the bottom end 59 of the track 58, so as to be about two feet below the waterline for extracting the Sargassum. The upper end of the deployed conveyer belt 7 is located above the cargo hold 46, as shown in FIGS. 2 (dotted line) and 12 (solid line). The extracted Sargassum is discharged from the upper end of the conveyor belt 7, goes through the funnels 17, and then into the cargo hold 46 (e.g., into cargo bags that are supported in the cargo hold by a bracket).

The gap between the conveyor belt 7 and pontoon 1 provides space for a forward stainless-steel deflector and support bracket 60 to be attached at the lower end of the conveyor belt (on each side). Because the bottom of the conveyor belt is below the bottom of the pontoons when fully lowered during the extraction process, hard materials (such as floating logs or other large debris) could get jammed between the outer edge 67 of the submerged conveyor belt and the pontoon so as to damage the belt. The deflector bracket 60 is at a forward angle (e.g., a 45 degree angle) to deflect any floating material and prevent such damage. Further, an angular cutout on the lower surface of the deflector bracket 60 (near its far end) interfaces with a protruding support rod 69 (e.g., one inch long) that is attached to the inner surface of the pontoon 1 to provide support for the conveyor belt. This provides additional support at the end of the conveyor belt, where the load is the highest during the extraction process. Thus, there are no unsupported conveyor belt loads during the extraction process.

Additionally, because the deployed conveyor belt 7 extends past the lower end 59 of the track 58, there are no rollers on the lower portion of the conveyor belt (e.g., lower 5.5 feet of the conveyor belt if the track terminates two feet from the bottom of the pontoons, or lower four feet if the track terminates 1.5 feet from the bottom of the pontoons). A support roller 57 is attached to each pontoon 1 in the location of the deflector bracket 60 when the conveyor belt 7 is fully retracted. The bottom of the deflector bracket 60 glides over the support roller 57 to provide support for the lower end of the conveyor belt 7 when the conveyor belt 7 is fully retracted.

A removable inspection/maintenance plate 61 is incorporated along the track (e.g., three feet from the bottom of the pontoons) to allow the deflector bracket 60 to be installed after the conveyor belt has been placed on the track 58. The plate 61, which for example is 1.5 feet square, is removable from the inner side of the pontoon to allow installation of the deflector bracket 60 and to provide access for removal of the lower wheels, which receive the most wear due to periodic immersion.

In some embodiments, a high flow rate water jet system is located under the forward storage area. During the extraction process, this system directs a jet of water directly into the Sargassum being carried up by the conveyor belt. This side-to-side water jet helps to detach any living organisms in the extracted Sargassum and return them to the water before they reach the cargo hold.

Several features are provided to allow rough water operation (waves over 3 feet, such as 3-5 or 3-6 feet for a 36 foot model) and fast transit speeds (over 10 knots). The extraction vessel has the wave piercing type pontoons 1 with no lateral flare and a high length to beam ratio (i.e., 12 to 1 or 36 feet long by 3 feet wide in this embodiment, and generally at least 6 to 1, such as 8 or 10 to 1), as shown in FIGS. 7 and 8. Combined with a fine entry of 25 degrees, this greatly reduces drag. This fine entry is slanted inboard, so as to direct the incoming floating debris to the conveyor belt 7. And conveyor belt induced drag is eliminated during transit because the track 58 allows the conveyor belt 7 to be fully retracted (raised) for transit. In further embodiments, the pontoons 1 have a length to beam ratio of at least 6:1, or anywhere between 6:1 to 15:1.

The pontoons 1 have a height (e.g., 6 feet for a 36 foot length) that provides plenty of freeboard, and thus buoyancy, to deal with incoming waves. And in the embodiment of FIGS. 2 and 8, the variable buoyancy system includes the wave deflector panels 22 on the outer sides near the bow to generate additional lift. Depending on size of the motors (e.g., twin 70 to 90 HP outboard motors), the vessel provides transit speeds of over 10 knots (and typically of 12-15 knots, or even higher with larger motors). This is more than three times faster than a similarly sized conventional extraction vessel. The weight near the bow of the vessel has also been reduced by placing the storage structures, helm station, and retracted conveyor belt away from the bow of the vessel. This improves the ability of the vessel to rise over incoming waves. For example, in the exemplary 36 foot embodiment, the anchor chain locker is located about 15 feet from the bow, and the helm station is located over 20 feet from the bow. The helm station being located aft of the center line also reduces pitching motion and spray for the operator, making for a more comfortable and safer ride. Additionally, the high helm position improves the operator's ability to spot Sargassum patches and potentially dangerous objects such as coral heads.

And the pontoons 1 of this embodiment each have an angled notch taken from the outer bow end to create a deflection surface 55 (e.g., a 45% inclined deflection surface that begins 1.5 feet above the bottom of the pontoon), as shown in FIG. 9. This small deflection surface 55 is incorporated into the bottom of the bow end of each pontoon 1 in case the bow hits bottom while moving. In such a case instead of a sharp point digging into the bottom, the deflection surface deflects the bow upwards and off the bottom to prevent damage. This embodiment also has a transducer 54 for forward looking sonar located in a recessed cutout in the angled deflection surface 55 of one pontoon. The recess prevents damage to the sonar transducer in a collision.

The variable buoyancy system of one exemplary embodiment will now be described with reference to FIGS. 2 and 8. When deployed, the variable buoyancy floats 21 reduce the draft of the main hulls (pontoons) 1 to less than one foot on this 36 foot vessel. Thus, the vessel can operate in extremely shallow water. The pontoons 1 in this exemplary embodiment are each three feet wide, six feet high, and 36 feet long. The variable buoyancy floats 21 are each 2.5 feet wide, 2.5 feet high, and 25 feet long. The bow dead rise of each variable buoyancy float 21 is angled at 30 degrees, which is the same as the corresponding wave deflecting panel 22.

The inner bottom surface of each float 21 (when retracted) is attached by the recessed hinges 35 to the outer side of the pontoon 1 (e.g., 2.5 feet from the top of the pontoon). The variable buoyancy floats 21 are raised and lowered by the telescopic hydraulic cylinders 32 that are attached to brackets 33 and 34 that line up with the center of the recessed hinges. Brackets 33 are installed in cutouts on the upper portion of the inner surface of the pontoons 1, and brackets 34 are installed in cutouts in the middle of the upper surface of the floats (when deployed). These brackets allow the cylinders 32 to extend to lower a float 21 and retract to raise a float 21. One cylinder 32 is attached near the bow (e.g., eight feet from the bow) of the float 21, and the other cylinder is attached near the stern (e.g., 6.5 feet from the stern) of the float 21.

When in the raised (retracted) position, the bottoms of the variable buoyancy floats 21 are well above the bottoms of the pontoons and above the waterline (e.g., about 42 inches above the bottoms of the pontoons on this exemplary 36 foot vessel). This keeps the floats out of the water (i.e., the lowest surface of each variable buoyancy float is above the waterline) so as not to create drag. With each pontoon having a width of three feet and the conveyor having a width of seven feet, the beam of the vessel with the variable buoyancy floats retracted is 13 feet (3'+7'+3'), and the overall length to beam ration is 2.77 (36 to 13). The vessel operates in this mode when going to the extraction zone for increased transit speed.

The variable buoyancy floats 21 are deployed (lowered) when the vessel arrives at the extraction zone. When deployed, portions of the variable buoyancy floats are submerged, while the bottoms of the variable buoyancy floats 21 are still above the bottoms of the pontoons (e.g., about six inches above the bottoms of the pontoons on this exemplary 36 foot vessel). This provides increased buoyancy and lateral stability during the extraction process. With each variable buoyancy float having a width of 2.5 feet, the submerged beam of the vessel is increased to 18 feet (2.5'+3'+7'+3'+2.5'), which increases the overall length to beam ratio to 2.0 (36 to 18). This over 38% increase in beam, with its associated approximately 3,000 pounds of lift when the floats are submerged 6 inches, substantially increases buoyancy and stability. Thus, rolling motion is reduced to make the vessel safer and more comfortable for the crew. The decrease in rolling motion also makes the extraction process more efficient because extraction occurs on a more stable platform. The increased stability also reduces the loads experienced by the submerged portion of the conveyor belt.

The variable buoyancy floats are also deployed when the vessel approaches the shore for unloading. The stern of the vessel is slowly backed toward the shore with the variable buoyancy floats 21 deployed until the vessel touches the bottom. The variable buoyancy floats 21 are then retracted to reduce the buoyancy. This causes the pontoons 1 to fully and firmly rest on the bottom, which eliminates all floating related movement. Thus, the vessel does not bounce on the waves, so the unloading process is very safe and secure. Further, when the vessel is resting on the bottom, the floats do not touch the bottom due to the six inch space between the bottoms of the deployed floats and the bottoms of the pontoons. So while the pontoons have reinforced bottoms for this bottom contact, the bottoms of the floats do not have to be reinforced. This allows the floats to be kept as light as possible.

After the collected Sargassum is unloaded, the variable buoyancy floats 21 are lowered so that the vessel again floats for transit. Once the vessel reaches deeper water, the floats are raised for transit speed cruising and the process is repeated.

In this exemplary embodiment, hydraulic power for the hydraulic cylinders 32 for the floats is provided by a hydraulic system that also powers the hydraulic cylinders 11 for the conveyor belt 7, the hydraulic cylinders 10 for the lift bar 9 on the stern, and a hydraulic motor 8 on the extraction conveyor belt 7. A directional flow control valve directs flow to the cylinders or the conveyor belt motor because only one of these are used at a time. The pressure is much higher for the cylinders, which have chrome plated shafts to reduce corrosion, so a pressure relief valve is provided to control the pressure for the hydraulic motor 8, which also has a flow control valve for adjusting the speed of the conveyor belt. The hydraulic system includes a hydraulic pump that is powered by a 110 volt AC motor and fed from an oil reservoir. The AC power is provided by a gasoline or diesel generator. In this exemplary embodiment, the hydraulic pump and generator are mounted in watertight compartments that are respectively located on the starboard and port sides of the forward storage area 14. The anchor line (or chain) is located in an anchor locker located between these watertight compartments. The anchor line can be manually set and retrieved, or an electric windlass 23 can be provided for this purpose. In an alternate embodiment, an electric motor is used to power the conveyor belt.

FIGS. 14-16 show a trailer in accordance with an embodiment of the present disclosure. The trailer is used to directly unload the extraction vessel near the shore (e.g., at a beach). A cargo hold container can be put on the trailer, which can tilt. The trailer allows the cargo hold container to be unloaded quickly and easily. The loaded trailer can then be towed to an area for unloading the collected floating debris (e.g., Sargassum) into dump trucks or trailers for hauling. The emptied trailer can then be loaded with fuel, equipment, and supplies for the extraction vessel.

As shown, the trailer 77 has a central support beam 79 and side-to-side support beams 80. For this exemplary embodiment with a 36 foot extraction vessel, the trailer is 15 feet long by eight feet wide. The rear end corners 83 of the trailer taper down to 7 feet wide so that the trailer can be backed up to the seven foot wide cargo hold 46 of the vessel. The trailer has aluminum wheels 70 that are 3 feet in diameter and 1.5 feet wide, with rubber strips attached to the outer rims to eliminate wear when moving over hard, rocky, or paved surfaces. The top of the trailer is normally 2.5 feet off the ground. The rear axle has a manually operated lifting mechanism that allows it to be raised for easy entry of cargo bags brought in by support vessels. The lifting mechanism includes a lockable lift bar 85 and pivoting supports 72 and 78 for lifting the rear of the trailer. Trailer lifting eyes 75 are provided for raising the trailer into the loading position.

The front axle has a pivoting mechanism for steering the trailer. The pivoting mechanism includes a load bearing pivoting support 81 for a steering arm 76, with stops provided to limit the maximum turning angle of the wheels in order to prevent damage to the wheels and trailer. A removable trailer winch and ball receptacle 73 can be attached on either end of the trailer. A slanted connector bar 84 on the rear of the trailer has downward protrusions for connecting to the edge of the cargo hold of the extraction vessel.

FIG. 18 shows a cargo hold container that can be placed within the cargo hold 46 of the vessel. The cargo hold container 86 has a swinging unloading gate 92, locks 93, and a pivot pin 89 for swinging the unloading gate 92. Container lifting eyes 88 are located at the top of the container, and rollers 90 with gaps 91 in between to allow water drainage are located at the bottom of the container. The rollers allow easy movement of the container.

To unload from the extraction vessel directly onto the trailer at the shore, the vessel is first backed up to the shore with the variable buoyancy floats deployed. When the stern touches bottom, the variable buoyancy floats are retracted. The loss of buoyancy causes the entire bottoms of the pontoons to be firmly grounded on the bottom to provide stability during the unloading operation. With the vessel firmly grounded, the aluminum trailer 77 is backed up to the vessel and then a lift line attached to the vessel's lift bar 9 is connected to the trailer lifting eyes 75. The lift line is a block and tackle arrangement that leads to a winch on the outside portion of the lift bar 9 at an operational height. This lift line is used to lift the rear end of the trailer slightly higher than the bottom of the cargo hold 46. With the grounded vessel substantially still, the rear end of the trailer is then slowly lowered. This causes the three slanted protrusions 96 on the connector bar 84 on the rear of the trailer to slowly settle into notches in a support plate 97 that is bolted to the edge of the underside of the cargo hold 46 of the vessel, as shown in FIGS. 20 and 21. The lift bar 9 is then disconnected from the trailer as gravity now prevents any shifting between the vessel and trailer.

To unload the cargo hold container 86 from the cargo hold 46, the lift line attached to the vessel's lift bar 9 is attached to a support bar connected to the container lifting eyes 88 of the cargo hold container 86. The line is tightened to pick up the container 86, and then the lift bar 9 is moved aft by the hydraulic cylinder 10 to move the container 86 over the trailer 77. Then, the line from the trailer winch 73 is used to pull the container forward to be above the desired location on the trailer. At this point, the lift line is slowly released to lower the container 86 onto the trailer 77. A travel stop 87 is located on the front portion of the trailer 77 to prevent the cargo hold container 86 from sliding off the trailer.

When the unloading of the vessel is complete, the trailer 77 is disconnected from the support plate 97 and then towed to a discharge location for unloading. There the collected floating debris (e.g., Sargassum and/or plastic) can be loaded into a cargo trailer or dump truck for hauling to a recycling or disposal facility that is located away from the coast. At no time during the entire process of unloading the Sargassum from the vessel does the collected Sargassum make contact with the beach. This results in an entire extraction and disposal operation that is very clean and environmentally friendly. Alternatively, the same type of operation could be conducted to unload filled cargo bags from the cargo hold onto the trailer using the lift bar, one or two at a time.

The vessel can also be unloaded by loading the Sargassum into fast transit cargo bags 102 that are towed back to near the shore by a support vessel. In this case, the trailer 77 is pulled up to the shore in reverse so that the tilting end faces away from the water (i.e., reversed from the configuration described above). As shown in FIG. 19, a removable loading panel 94 is folded down to allow for easy loading of the cargo bags brought in by the support vessel. The trailer's lifting mechanism is raised and the lift bar 85 is locked. The trailer winch and ball receptacle 73 is attached to the opposite end of the trailer 77. With the trailer in this configuration at the shore, the cargo bags that were hauled to near the shore by the support vessel are winched up the loading panel and onto the trailer 77.

Further, if the extraction vessel is used in an area that has marina docking available, the unloading process can be accomplished by docking parallel to the dock. Then, the cargo hold container or cargo bags can be unloaded from the vessel using a shore mounted lift or crane. As another alternative, if the vessel can dock, stern to the dock with the cargo hold height close to the dock height, the lift bar can be used in a manner analogous to that described above to unload the cargo hold container or cargo bags directly onto the dock.

In one exemplary extraction system, operational efficiency is increased by unloading the Sargassum from the extraction vessel cargo bags right in the extraction zone. The cargo bags are towed back to shore by one or more support vessels, so the extraction vessel does not have to leave the extraction zone. FIGS. 22-29 show features of this extraction system. In this embodiment, funnel type appendages 17 are located in the cargo hold 46 under the conveyor belt discharge area. Each cargo bag is five feet high, 3.5 feet wide, and 2.5 feet deep, and made of reinforced panels of a solid heavy-duty fabric that can support towing loads and is resistant to ultraviolet light. Grommets 99 are provided along the upper edge of the cargo bag (e.g., three inches from the top of the bag), and openings for water drainage are provided at the bottom of the cargo bag.

The grommets 99 of an opened cargo bag are placed on hooks that are attached to the bottom side of a cargo bag support bracket 104. FIG. 24 shows the cargo bag support bracket, which is bolted to the side of the cargo hold 46 under the funnel 17. To make installation easier when empty and removal from the hooks easier when filled, the hooks on the support bracket are closer to the bottom of the cargo hold than the height of the grommets on the cargo bag (e.g., 54 inch high hooks and 57 inch high grommets on the bag, for an overlap of 3 inches). When the cargo bag is filled, a flap 103 covering the top is secured with fasteners 100 (e.g., SS twist stud fasteners 100 that securely seal the top and side of the bag) to keep all of the Sargassum in the bag during towing and loading, as shown in FIG. 23.

When being installed, three inch high and 42 inch wide openings 106 are provided on the inner/forward side of the funnel 17 on both sides to allow the upper cargo bag cover to be passed to the outside of the support bracket so as not to interfere with the loading operation. Also, the funnel 17 has hinges 105 that allow the funnel to be tilted up on its forward side and secured by a centrally located tilting bar 107, as shown in FIG. 28. This facilitates cargo bag installation and removal from the support bracket.

Connecting D-rings 98 are attached to the upper and lower sides of the cargo bag on the towing side of the bag, as shown in FIGS. 22 and 23. A floating towing rod 108 with snap rings on the ends (FIG. 29) connects with the D rings 98 and with a bridle connection on the other side for towing. Cargo bags can be tied together by a floating line tied between them for towing one behind the other. In one exemplary embodiment, three cargo bags that are tied together in such a manner are dropped off the stern of the extraction vessel with a floating flag buoy tied to one of the bags.

When the support vessel gets near the extraction vessel, a line is thrown to the cargo hold operator. Tied to this line are additional cargo bags that are needed to continue with the extraction process. The operator attaches the line to the lift bar 9, which is in the extended position over the water behind the stern. The cargo bags are then lifted using the lift line attached to the lift bar and brought aboard the extraction vessel. Next, the support vessel picks up and tows the floating cargo bags in a double chain of six (three on each side of vessel) and returns to shore (for a trailer with a load limit of six cargo bags).

Several support vessels can be used to all the continuous return of the filled bags to shore and the resupplying of the extraction vessel with the additional cargo bags. When the support vessel reaches the shore, the loaded cargo bags are winched onto the trailer in the manner described above. Another set of cargo bags is picked up by the support vessel for delivery to vessel and the towing process is repeated. Using this extraction system, new crew and supplies can also be brought to the extraction vessel so to that continuous 24 hour operation is feasible.

In one embodiment in which the cargo bags are loaded side by side on the trailer, a 42 inch loading bar connects to the trailer's winch on its center line and has connections on each end for the tow rings on the cargo bags. This allows two cargo bags to be winched up onto the trailer at the same time. This is repeated three times to load the trailer with six cargo bags. And because the cargo bag loading takes place in very shallow water, the loading panel 94 is attached by hinges to the low end of the trailer to address bottom irregularities, as shown in FIG. 19. The lower end of the loading panel 94 rests on the bottom to give the cargo bags a continuous and smooth surface during the winching process. This reduces tow line tension, eliminates any damage, and minimizes wear. For beaches with very shallow slopes, the trailer can be disconnected from the tow vehicle and manually positioned at the shore when empty. A tow line can then be attached to the tow vehicle to pull the loaded trailer onto the beach for hookup and towing to the transfer area.

For a coastline with breaking wave conditions, a different unloading process can be used. In this example, two mooring buoys are deployed in line outside the offshore bar in calmer waters away from the breaking surf. The seaward (further offshore) buoy is used by the extraction vessel and the other buoy has a block and tackle arrangement with lines leading to a shore station. A manual or electric winch manipulated block and tackle set up is provided at the shore station so that the lines can be pulled in from the mooring and pulled out to the mooring. The loaded extraction vessel ties up to the seaward mooring and then slowly backs itself toward the other and picks up the block and tackle line, which would contain a hookup ring. For this operation, cargo bags are attached to the ring on the line two at a time and deposited in the water. The line would then start getting pulled to shore while other cargo bags are attached to the line from the last bag in the series until the vessel has been unloaded. If a support vessel is available, it instead of the vessel would be performing this operation. An inflatable with an inflatable (soft) bottom is loaded with empty cargo bags and supplies and attached to the ring on the block and tackle line. The process is then reversed by pulling the line out with the attached inflatable until reaching that mooring where the load transfer can be made to the extraction or support vessel.

FIGS. 30-32 show a system for adding wheels to the extraction vessel for removal from the water in accordance with one embodiment of the present disclosure. Many of the beaches affected by Sargassum are located in tropical areas so there is a high potential for strong storms and even hurricanes. When such conditions approach the area where the extraction vessel is deployed, it is not safe for the vessel to remain in the water. However, many of these same beaches also have a scarcity of available dockage in ports or harbors, especially when such conditions occur. Therefore, a system is provided to allow the extraction vessel to be towed out of the water and onto the beach to prevent damage. In particular, non-floating aluminum wheels 109 are temporarily attached to the pontoons 1.

In this embodiment, each of the pontoons 1 has two tubular slots 110 located directly below forward and aft collision bulkheads that are installed in the pontoons (e.g., one eight feet from the bow and one eight feet from stern near the bottom of the 36 foot vessel). These bulkheads add rigidity to this concentrated load area. The tubular slots 110 are covered with removable external caps 122 when not in use. When the vessel needs to be pulled out of the water, six inch diameter steel wheel attachment rods 111 are inserted through the pontoons 1. Attached to the rods 106 are circular 12 inch spacer plates 112, one permanently attached inside the wheel and another removably attached outside the wheel. These spacer plates 112 prevent the wheel 109 from making contact with the pontoon 1 or falling off the rod 111. The inner spacer plate 112 also acts as a stop to prevent the rod from moving inward. A washer 113 is provided between each plate 112 and the wheel 109 to prevent metal on metal contact and reduce wear.

In this embodiment, the wheels 109 are 54 inches in diameter, 30 inches wide, and all-aluminum with a plastic or rubber covering on the outer surface. The large footprint of the wheels provides support for the vessel in the soft dry sand of the beach. The rods 111 are 90 inches long, including a 12 inch extension 116 past the inner side of the pontoon 1, 36 inches inside the pontoon, 2 inches for the spacer plates and washers, 30 inches for the wheels, and 10 inches for an outside wheel locking cap and washer with a slotted extension (for connection to the wheel installation device).

Because a 54 by 30 inch heavily constructed aluminum wheel is heavy, an installation system is provided for installing the wheels on the floating extraction vessel. The installation system includes an 8 to 10 foot long and six inch wide wheel installation tube 114. To reduce weight, the tube 114 is aluminum except for a steel insert rod 120 that connects to the wheel support steel rod 111. The steel insert rod 120 is two foot long, with one foot exposed and the other foot located within the aluminum tube for a strong connection. The end of the wheel support rod 111 has a 1.5 inch slot with a hole for a connecting pin. The steel end 120 of the wheel installation rod 114 has a cut out on both sides so that the center portion is also 1.5 inches wide and also contains a hole. The end portion of the wheel installation rod is flat so that when this rod aligns with the wheel support rod 111, alignment is guaranteed and further movement is stopped. The lower portion of the wheel installation rod is round so the pin can be inserted.

Before installing the wheels, the potential for outward deflection of the pontoons needs to be addressed because all the weight of the vessel will be exerted by the wheels on the outside of the pontoons. The loads need to be transferred evenly so that no sideways loading occurs. For this purpose, the inner portion 116 of the wheel support rod 111 extends one foot past the inner side of the pontoon. This inner portion 116 is used as a connector for a five foot rod 117 with five inch inserts at the ends. This connects to both sides to make the wheels seem like they are mounted on a solid axle, and therefore eliminates any side deflection of the pontoons. On the wheel loading tubes the slots are vertical because up and down movement will occur.

For the connector rod the connecting slots with the wheel support rods are horizontal so that the inserts slide in during installation without support by the operator. On one side the insert has a hole for one installation bolt 118, and on the other side the insert has a slot 119 for the other installation bolt. This addresses small differences in the width separation of the pontoons. When the bolts are tightened, the pontoons can no longer deflect outward, so structural integrity of the vessel is assured. Further, steel sleeve inserts 115 that are one foot long are installed in the middle of the connector rod. These are moved to cover the bolt connection area evenly with a pin on the inside to prevent movement. To the outboard of these right next to the pontoons, straps are installed on either side to form a harness that can be used to tow the vessel out of the water by a tractor or tow vehicle. Before towing begins, the vessel must be pointed in the right direction. Alternatively, a steering ability could be incorporated into the system.

For installation, the wheel 109 is slid in from the outboard end of the wheel installation tube 114. The inner side of the tube is connected with a bolt to the wheel support rod 120. A support bar 121 is then connected to the end of the wheel installation tube so that an operator on each side can raise the tube while another operator on each side slides the wheel towards the boat. When the tube cannot be raised any further, the tube and rod are perfectly aligned and the wheels can be slid into place on the support rod. When the wheels are all the way in place, the tube is disconnected and the plastic and steel plate is installed and locked in position.

After all four wheels have been installed in this manner, the vessel is ready to be towed out of the water and onto the beach.

Later when the vessel is returned to the water, the wheels are removed and the caps are reinstalled to reduce drag in transit. The internal washer and locknut 125 are permanently attached to the connector rod 123, and the external cap 122 has a tapered entry slot 124 that facilitates the insertion of the rod.

Accordingly, embodiments of the present disclosure provide an improved floating debris extraction vessel with fast transit speeds that is capable of operation in rough water conditions. The floating debris extraction vessel of one embodiment has a retractable extraction conveyor belt that simply retracts when not in use during transit to move its weight aft and totally eliminate any water induced drag. In some embodiments, the floating debris extraction vessel has variable buoyancy floats that reduce draft to make the vessel capable of shallow water deployment. The extraction vessel achieves operational efficiency in all weather conditions.

The terms "a" or "an", as used herein, are defined as one or more than one. The term plurality, as used herein, is defined as two or more than two. The term another, as used herein, is defined as at least a second or more. The terms "including" and "having," as used herein, are defined as comprising (i.e., open language). The term "coupled," as used herein, is defined as "connected," although not necessarily directly, and not necessarily mechanically.

All references cited herein are expressly incorporated by reference in their entirety. It will be appreciated by persons skilled in the art that the present invention is not limited to what has been particularly shown and described herein above. In addition, unless mention was made above to the contrary, it should be noted that all of the accompanying drawings are not to scale. There are many different features to the present invention, and it is contemplated that these features may be used together or separately. Thus, the present invention should not be limited to any particular combination of features or to a particular application. Further, it should be understood that variations and modifications within the spirit and scope of the present invention might occur to those skilled in the art to which the present invention pertains. Additionally, an embodiment may not include all of the features described above. Accordingly, all expedient modifications readily attainable by one versed in the art from the disclosure set forth herein that are within the scope and spirit of the present invention are to be included as further embodiments.

What is claimed is:

1. An extraction vessel for extracting floating debris, said extraction vessel comprising:
    two pontoons forming parallel hulls of the vessel;
    a cargo hold located between the pontoons; and
    a retractable extraction conveyor belt located between the pontoons, the conveyor belt being mounted on tracks so as to be movable on the tracks between a retracted position and a deployed position,
    wherein in the retracted position, a lower end of the conveyor belt is above a waterline of the vessel for transit, and
    in the deployed position, the lower end of the conveyor belt is below the waterline for extracting the floating debris, and an upper end of the conveyer belt is above the cargo hold such that the floating debris is discharged from the upper end of the conveyor belt into the cargo hold.

2. The extraction vessel according to claim 1,
    wherein at least a portion of one of the tracks is flush mounted in one of the pontoons, and at least a portion of another of the tracks is flush mounted in the other of the pontoons, and
    rollers are attached to both sides of the conveyor belt, the conveyor belt being attached to the tracks by the rollers.

3. The extraction vessel according to claim 1, wherein in the retracted position the upper end of the conveyor belt is above upper ends of the tracks, and the upper end of the conveyor belt rests on top of a lift bar so as to support the upper end of the conveyor belt.

4. The extraction vessel according to claim 1, further comprising:
    a bracket attached to the lower end of the conveyor belt; and
    a support attached to an inner surface of at least one of the pontoons,
    wherein in the deployed position, the lower end of the conveyor belt is below lower ends of the tracks, and the bracket interfaces with the support so as to support the lower end of the conveyor belt.

5. The extraction vessel according to claim 1, further comprising a superstructure attached between the pontoons, the superstructure including a helm station that is located aft of the center line of the vessel.

6. The extraction vessel according to claim 1, wherein each of the pontoons has a length to beam ratio of at least 6:1 and a bow with no lateral flare.

7. The extraction vessel according to claim 1, wherein a bottom of a stern portion of each of the pontoons is rounded so as to direct upwards the attached laminar water flow.

8. The extraction vessel according to claim 1, further comprising:
    two variable buoyancy floats, one of the variable buoyancy floats being attached to each of the pontoons so as to be movable between a retracted position and a deployed position,
    wherein in the retracted position, a lowest surface of the variable buoyancy float is above the waterline, and
    in the deployed position, a portion of the variable buoyancy float is submerged for increased buoyancy.

9. The extraction vessel according to claim 8, further comprising two wave deflectors, one of the wave deflectors being attached to each of the pontoons so as to be in front of the variable buoyancy float that is attached to that pontoon.

10. The extraction vessel according to claim 1, wherein in the retracted position, the lower end of the conveyor belt is at least six inches above the waterline of the vessel.

11. The extraction vessel according to claim 1, wherein in the retracted position, the lower end of the conveyor belt is at least one foot above the bottoms of the pontoons.

12. The extraction vessel according to claim 1, further comprising:
    a superstructure attached between the pontoons, the superstructure including a helm station that is located aft of the center line of the vessel;
    a bracket attached to the lower end of the conveyor belt;
    a support attached to an inner surface of at least one of the pontoons;
    two variable buoyancy floats, one of the variable buoyancy floats being attached to each of the pontoons so as to be movable between a raised position and a lowered position; and two wave deflectors, one of the wave deflectors being attached to each of the pontoons so as to be in front of the variable buoyancy float that is attached to that pontoon, wherein at least a portion of one of the tracks is flush mounted in one of the pontoons, and at least a portion of another of the tracks is flush mounted in the other of the pontoons, rollers are attached to both sides of the conveyor belt, the conveyor belt being attached to the tracks by the rollers, in the deployed position, the lower end of the conveyor belt is below lower ends of the tracks, and the bracket interfaces with the support so as to support the lower end of the conveyor belt, in the retracted position, the upper end of the conveyor belt is above upper ends of the tracks, and the upper end of the conveyor belt rests on top of a lift bar so as to support the upper end of the conveyor belt, a lowest surface of the variable buoyancy float in the raised position is above the waterline, and a portion of the variable buoyancy float in the lowered position is submerged for increased buoyancy.

13. An extraction vessel for extracting floating debris, said extraction vessel comprising:

two pontoons forming parallel hulls of the vessel;

a cargo hold located between the pontoons;

an extraction conveyor belt located between the pontoons, the conveyor belt being movable between a raised position in which a lower end of the conveyor belt is above a waterline of the vessel, and a lowered position in which the lower end of the conveyor belt is below the waterline and an upper end of the conveyer belt is above the cargo hold;

two variable buoyancy floats, one of the variable buoyancy floats being attached to each of the pontoons so as to be movable between a retracted position and a deployed position, wherein in the retracted position, a lowest surface of the variable buoyancy float is above the waterline, and in the deployed position, a portion of the variable buoyancy float is submerged for increased buoyancy.

14. The extraction vessel according to claim 13, wherein in the deployed position, the bottom of the variable buoyancy float is above the bottom of the pontoon to which it is attached.

15. The extraction vessel according to claim 13, further comprising two wave deflectors, one of the wave deflectors being attached to each of the pontoons so as to be in front of the variable buoyancy float that is attached to that pontoon.

16. The extraction vessel according to claim 13, wherein each of the variable buoyancy floats is moved between the retracted and deployed positions by at least two hydraulic cylinders that are attached between that variable buoyancy floats and one of the pontoons.

17. The extraction vessel according to claim 16, wherein each of the variable buoyancy floats is attached to the one pontoon by at least two recessed hinges.

18. The extraction vessel according to claim 13, further comprising a superstructure attached between the pontoons, the superstructure including a helm station that is located aft of the center line of the vessel.

19. The extraction vessel according to claim 18, wherein each of the pontoons has a length to beam ratio of at least 6:1 and a bow with no lateral flare.

20. The extraction vessel according to claim 19, wherein a bottom of a stern portion of each of the pontoons is rounded so as to direct upwards the attached laminar water flow.

* * * * *